(12) United States Patent
Petrov (10) Patent No.: US 11,824,758 B2
(45) Date of Patent: Nov. 21, 2023

(54) CONSISTENT UPDATE OF ROUTING TABLES IN A DISTRIBUTED MESSAGING SYSTEM

(71) Applicant: AMADEUS S.A.S., Biot (FR)

(72) Inventor: Mikhail Petrov, Antibes (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 17/752,479

(22) Filed: May 24, 2022

(65) Prior Publication Data

US 2022/0385561 A1    Dec. 1, 2022

(30) Foreign Application Priority Data

May 27, 2021  (EP) .................................... 21305700

(51) Int. Cl.
*H04L 45/023* (2022.01)
*H04L 45/021* (2022.01)
*H04L 45/42* (2022.01)

(52) U.S. Cl.
CPC .......... *H04L 45/023* (2013.01); *H04L 45/021* (2013.01); *H04L 45/42* (2013.01)

(58) Field of Classification Search
None
See application file for complete search history.

(56) References Cited

U.S. PATENT DOCUMENTS 6,680,933 B1 * 1/2004 Cheesman ......... H04Q 11/0478
370/395.43
2013/0138834 A1 * 5/2013 Imamura ............... G06F 9/5088
709/242

* cited by examiner

*Primary Examiner* — Oleg Survillo
*Assistant Examiner* — Christopher P Cadorna
(74) *Attorney, Agent, or Firm* — Perry + Currier (57) ABSTRACT

The present invention is directed to a system and a method for facilitating the consistent update of routing tables across the routers of a routing layer in a distributed messaging system. The routers are configured to send together with the outbound message the routing table version used to route the outbound message, which is compared, at the level of the enqueue layer, with the latest deployed routing table version and/or the latest routing table version used to route messages to the requested message queue. If the routing table version of the outbound message is older than the latest deployed routing table version and/or the latest routing table version used to route messages to the requested message queue, then the outbound message is rejected, otherwise, the message is enqueued to the requested message queue.

20 Claims, 6 Drawing Sheets

CONSISTENT UPDATE OF ROUTING TABLES IN A DISTRIBUTED MESSAGING SYSTEM

CROSS-REFERENCE TO RELATED APPLICATIONS

This application claims priority from European patent application no. 21305700.3, filed May 27, 2021, the contents of which are incorporated herein by reference.

FIELD

The present invention relates to a distributed messaging system and, more in particular, to a distributed messaging system that enables routing table updates to be consistently performed across the routers of a routing layer.

BACKGROUND

Messaging systems are widely used to communicate messages between different computer systems. In a messaging system, messages are routed to corresponding target systems via a routing layer comprising several routers. The routers are provided with a routing table version indicating the mapping between the messages and the corresponding target systems. To ensure correct routing of messages, all routers in the routing layers must use the same routing table version. Therefore, during a deployment of a new version of the routing table in the distributed messaging system, all routers must be notified and switch to the newly deployed version to route future messages. As such, in a distributed messaging system is critical for all routers to become eventually consistent so that all messages are routed using the latest routing table version deployed in the system. Furthermore, routers using the old routing table version should be identified and prompted to switch to the latest deployed routing table version, thereby preventing messages to be routed to the wrong target system.

The existing solutions dealing with the synchronisation of routing table versions in a distributed system involve using a central repository storing a main routing table version to be used by all routers. In this approach, each router retrieves a routing table from the central repository prior to routing a message. As such, all routers use the same routing table, and there is a single point for updating, i.e. an update may be carried out by updating the routing table in the central repository. However, using a central routing table introduces latency in the messaging system since the routers need to query the central repository each time a message is sent. Furthermore, the use of a central routing table introduces a single point of failure. Other solutions dealing with synchronisation of routers involve pausing the operation of the messaging system until the routing table update is carried out on all routers or relying on event synchronisation. However, such practices require that the system operation is suspended until the update is carried out, which is impractical for a distributed system dealing with a large volume of messages. Furthermore, existing solutions may rely on electing a router as a leader in the routing layer to manage the routing table update. However, electing a leader is time intensive process, which would introduce delays in the operation of the messaging system.

SUMMARY OF THE INVENTION

There is a need to provide a system and/or a method to prevent messages from routed to the wrong target systems and to ensure that the routers are switched to the newly deployed version of the routing table while minimising interruptions to the operation of the messaging system, thereby ensuring that all routers in the routing layer become eventually consistent.

According to a first aspect of the present invention, a distributed messaging system is provided for communicating messages between a source system and one or more target systems, the messaging system comprising: a routing layer comprising a plurality of routers, each configured for receiving inbound messages from the source system and generate corresponding outbound messages to be routed to message queues associated with the desired target systems in accordance with a routing table version stored in a local database associated with one or more routers of the routing layer; a plurality of enqueuers, each configured to process the outbound messages received from the routers before forwarding the outbound messages to the corresponding message queues associated with the requested target systems; wherein each outbound message comprises the routing table version used by the router during processing of the inbound message; and wherein prior to forwarding an outbound message to a corresponding message queue, each enqueuer is configured to; retrieve from a version database a system state comprising information associated with the latest routing table version deployed in the messaging system and information associated with the latest routing table version used to route outbound messages to the requested message queue, compare the routing table version of the outbound message with the routing table version information contained in the retrieved system state, and in response to determining that the routing table version of the outbound message is older than the latest deployed routing table version and/or the latest routing table version used to route messages to the requested message queue, each enqueuer is configured to reject the outbound message, otherwise, the outbound message is enqueued to the message queue associated with the target system.

Each router may be provided with a local database containing both the latest deployed routing table version in the messaging system and the latest routing table version used by the router to route messages. However, the routers in the routing layer may haven't switched yet to the latest deployed routing table version and still use the last routing table version to route messages. As such, it is important to identify outbound messages routed with the wrong routing table version and reject them. Otherwise, outbound messages may be forwarded to the wrong target system. By performing a routing table comparison at the level of the enqueuers, messages routed with the wrong routing table are identified and rejected. The present invention performs at the level of the enqueuer a check to determine whether the routing table version used by the router to route the outbound messages corresponds to the routing table version information contained in the system state of the distributed messaging system, which is retrieved from a version database associated with the enqueuers. The system state contains information on the latest deployed routing table version in the distributed messaging system and information on the latest routing table version used to route messages to the requested message queue. If the routing table version of the outbound message is older than the routing table version information indicated in the system state, then the enqueuer is configured to reject the message, thereby preventing the transmission of the outbound message to the wrong target system. The routing table comparison is performed based on the routing table version information transmitted together with the outbound message by the router.

According to embodiments of the present invention, each enqueuer is configured, upon processing the outbound message, to send a processing notification to the corresponding router indicating the successful processing or rejection of the outbound message. The processing notification comprises a set of values representing the system state of the distributed messaging system. For example, the set of values may be in the form of a tuple.

The tuple may comprise a finite ordered list, or sequence, of elements, e.g. values associated with routing table versions. As such, the tuple may comprise values associated with the routing table version currently used for routing messages and values associated with the latest deployed routing table version.

The latest deployed routing table version and the latest routing table in use for routing messages to a corresponding message queue are stored in the version database, which may be a shared database. The values of the routing table versions indicate the state of the system, as previously discussed. The distributed messaging system may operate in the following three states, which may be identifiable by the set of values representing the routing table versions currently deployed and currently in use in the messaging system, the system states may be as follows:

Normal processing: all of the components are using the same routing table version, and as such, all of the deployed and used versions are equal.

Deployment: all of the components use the same routing table version while a newer version is being deployed to the computer nodes hosting the distributed messaging system.

Activation: some of the components have started to use the new routing table version deployed during deployment, but other components still use the previous routing table version. In the activation state, all of the deployed versions are equal and newer than the oldest used version of the routing tables. In the activation state, the distributed messages systems need to identify messages routed with the wrong configuration and alert the corresponding routers accordingly.

According to embodiments of the present invention, each router is configured, in response to receiving a rejection notification, to switch to the latest deployed routing table version stored in the local database and reprocess the corresponding inbound message with the new routing table version. A rejection notification alerts the router that is using the wrong routing table version to route messages. The router is informed that a newer routing table version is stored in the local database. The router switches to the new routing table version and reprocesses the rejected inbound message. In this way, the router dynamically switches to the newer routing table version stored in the database without the interrupting the operation of the distributed messaging system. As such, the present invention ensures that the routers are informed of the deployment of a routing new version, and dynamically switches to the new version without interrupting the operation of the messaging system and/or requiring the election of a local leader to manage the routing table update. In this way, all routers in the routing layer would become eventually consistent and each would eventually switch to the new version in response to notifications received from the enqueuers.

According to embodiments of the present invention, each router is configured to compare the set of values contained in the processing notification to determine if the routing table versions representing the system state are equal, and in response to the routing table versions being different, each router is configured to switch to an activation mode, where each inbound message is processed first with the latest routing table version used by the router and subsequently with the latest deployed routing table version. As previously indicated, the values of the routing table versions indicate the state of the distributed messaging system.

The enqueuers are configured to inform the router of the routing table versions available in the system. Each router is configured to process the processing notification and the information contained therein to determine whether the message was processed successfully or rejected and whether there is a difference routing table version information representing the system state. If the set of values representing the system state indicate that the routing table versions are different, then the router is configured to switch to an activation mode, whereby the router retrieves the latest version of the routing table from the local database. In the activation mode, the inbound messages are processed first with the most recent routing table version deployed in the system and subsequently with the most recent routing table version used by the router to route messages. The output of the first processing with the latest routing table version deployed in the system is a list of notifications to be sent to one or more enqueuers in the form of an outbound message comprising information indicating that the router has switched to the latest deployed routing table version. The enqueuers, upon receiving the notification, may update the system state stored in the version database, which would be used to determine whether to forward or reject future outbound messages.

According to embodiments of the present invention, each router is configured, prior to sending the outbound message with the latest deployed routing table version, to determine if the enqueuer scheduled to receive the next outbound message is the same in both the latest deployed routing table version and the latest routing table version used by the router.

According to embodiments of the present invention, in response to the enqueuer being different, each router is configured to first send a set of routing notification to one or more enqueuers defined in the latest routing table version used by the router, the routing notifications indicating to the one or more enqueuers the version of the routing table currently in use by the messaging system for routing messages.

As such, the enqueuers which used to receive similar outbound messages routed against the older routing table version would be notified of the new routing table version in use for routing messages and won't enqueue outbound messages from the routers which are still using an older routing table version. As such, by sending the routing notification, the enqueuers are notified of the routing table version change.

According to embodiments of the present invention, in response to receiving a routing notification, each enqueuer is configured to update the system state in the version database with the information of the information received from the router associated with the routing table version currently in use, such that outbound messages received from the router using an older routing table version are rejected. In this way, the enqueuers are informed of the version currently in use in the messaging system and accordingly update their corresponding version database such that outbound messages received from a router with an older routing table version are rejected.

According to embodiments of the present invention, each router is configured for storing inbound and outbound messages until they are successfully processed by the corresponding enqueuers.

The routers may be configured to send the notification informing the enqueuers of the switch to the new routing table version only when the routing table versions, i.e. the latest used routing table version and the latest deployed routing table version, indicate that enqueuers are different, e.g. the enqueuers or the computer node hosting the enqueuers are different.

In general, the routers are configured to switch from the activation mode back to a normal processing mode when the processing notifications issued by the enqueuers indicate that the routing table version information representing the system state indicate that the latest deployed and currently used routing table versions are the same.

The present invention enables the routers to dynamically switch to the latest deployed routing table version based on information received from the enqueuers processing the transmitted outbound messages and without the need for interrupting the operation of the messaging system. This is achieved by monitoring the system state of the distributed messaging system and accordingly perform the necessary actions e.g. switching routing table version in the activation mode. Eventually, all routers in the distributed messaging system would switch to the latest deployed version, and their operation would return back to normal processing i.e. each inbound message is processed only once.

According to embodiments of the present invention, the source system is configured, upon receiving the enqueued notification from the router, for transmitting the next inbound message in the sequence to the routing layer. The source system is configured to send inbound messages to the routers of the routing layer in a predetermined sequence or order, i.e. one after another. The source system sends the inbound messages to the routing layers, where they are received by a load balancer module, which is configured to distribute the processing load across the router of the routing layer.

According to embodiments of the present invention, each message queue is communicatively coupled to a dequeuer layer, which is configured to retrieve messages from the message queue and deliver them to the target system associated with the message queue.

According to embodiments of the present invention, a routing table comprises a map between the message queues and the corresponding enqueuers.

According to a further aspect of the present invention, a method for communicating messages in a distributed messaging system between a source system and one or more target systems is provided, the method comprising: receiving, at a router of a routing layer, an inbound message from the source system for delivery to a target system; generating, by the router, an outbound message corresponding to the received inbound message, the outbound message comprising a routing table version used by the router during processing of the inbound message; routing, by the router, the outbound message to an enqueuer associated with a message queue of the requested target system in accordance with the routing table version; receiving, at the enqueuer, the outbound message; and forwarding, by the enqueuer, the outbound message to a message queue associated with the requested target system; wherein prior to forwarding an outbound message to a corresponding message queue, the enqueuer is configured to perform the steps of: retrieving from a version database a system state comprising information associated with the latest routing table version deployed in the messaging system and information associated with the latest routing table version used to route outbound messages to the requested message queue, comparing the routing table version of the outbound message with contained in the retrieved system state, and in response to determining that the routing table version of the outbound message is older than the latest deployed routing table version and/or the latest routing table version used top route messages to the requested message queue.

In some embodiments, the method comprises method steps corresponding to any one of the distributed messaging system for communicating messages functions set out above.

BRIEF DESCRIPTION OF THE DRAWINGS

The following drawings are provided as an example to explain further and describe various aspects of the invention.

DETAILED DESCRIPTION

The present invention will be illustrated using the exemplified embodiments shown in the figures, which will be described in more detail below. It should be noted that any references made to dimensions are only indicative and do not restrict the invention in any way. While this invention has been shown and described with reference to certain illustrated embodiments thereof, it will be understood by those skilled in the art that various changes in form and details may be made therein without departing from the scope of the invention. Furthermore, while the invention has been described with references to a particular system and/or a method for managing the synchronisation of routing configuration files in a distributed messaging system, it should be understood by those skilled in the art that changes in the form and details may be made to facilitate other types of method and/or systems in related fields without departing from the scope of the invention.

Figure 1:
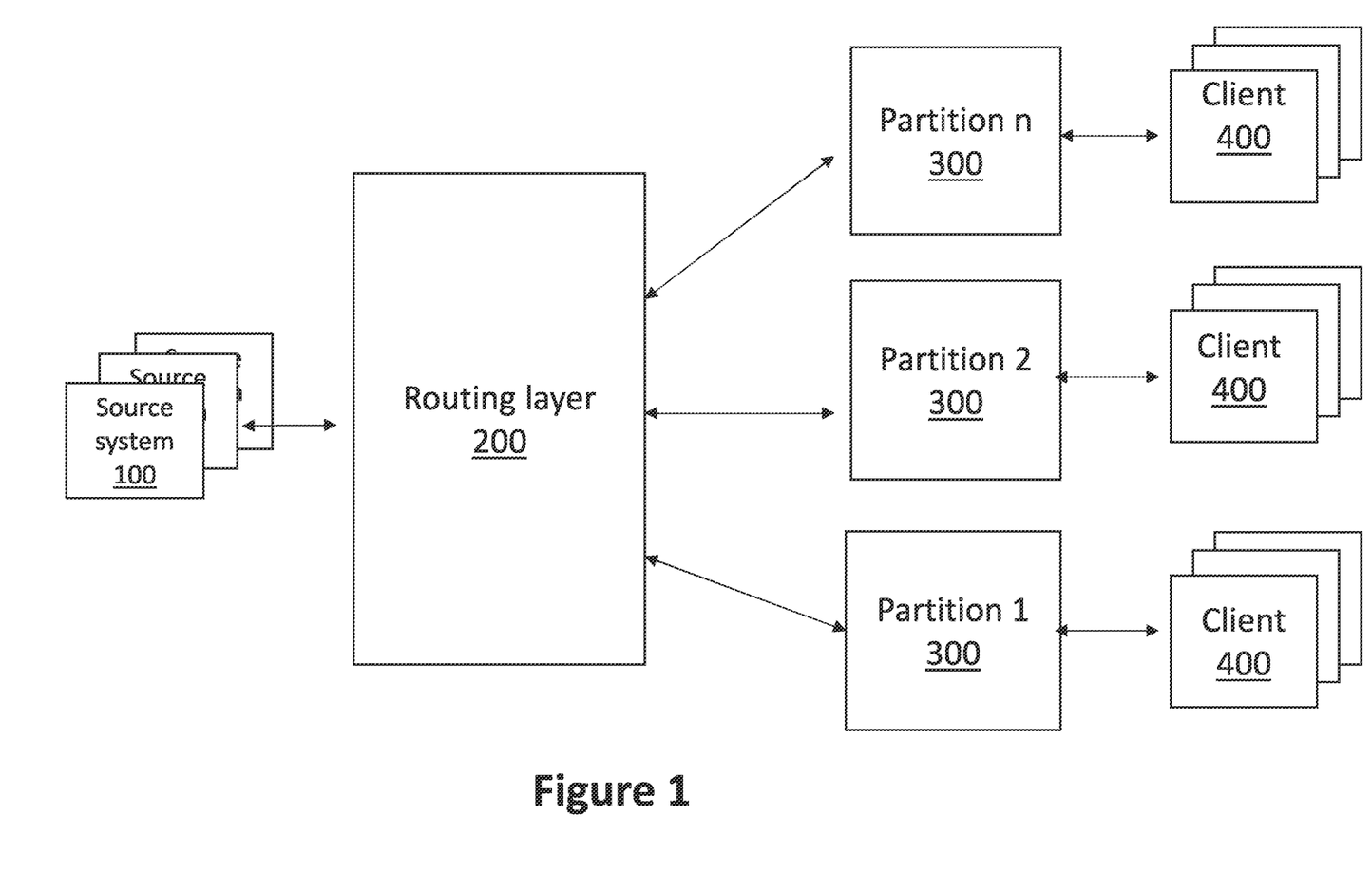
FIG. 1 shows an example of a distributed messaging system architecture according to embodiments of the present invention.

FIG. 1 shows an exemplified implementation of a distributed messaging system according to embodiments of the present invention. The messaging system may be hosted in one or more computer nodes, which may be partitioned into one or more message processing partitions 300. Each message processing partition is configured to map messages send from one or more source systems 100 to message queues associated with the one or more client target systems 400. A routing layer 200 is provided to route inbound messages send by a source system 300 to the processing messaging partition associated with the requested target system. To ensure the correct routing of messages, routers 210 are provided with a routing table, which provides a map indicating the partition location of the message queue associated with the target system 400. As the routing layer 200 is distributed across the computer nodes, all routers must use the same routing table version to route messages. Otherwise, messages may be forwarded to the wrong partition. As such, during an update of the routing table version is essential that the routers 210 become eventual consistent, i.e. updated with the new routing table version while ensuring minimal interruption to the operation of the distributed messaging system.

Figure 2:
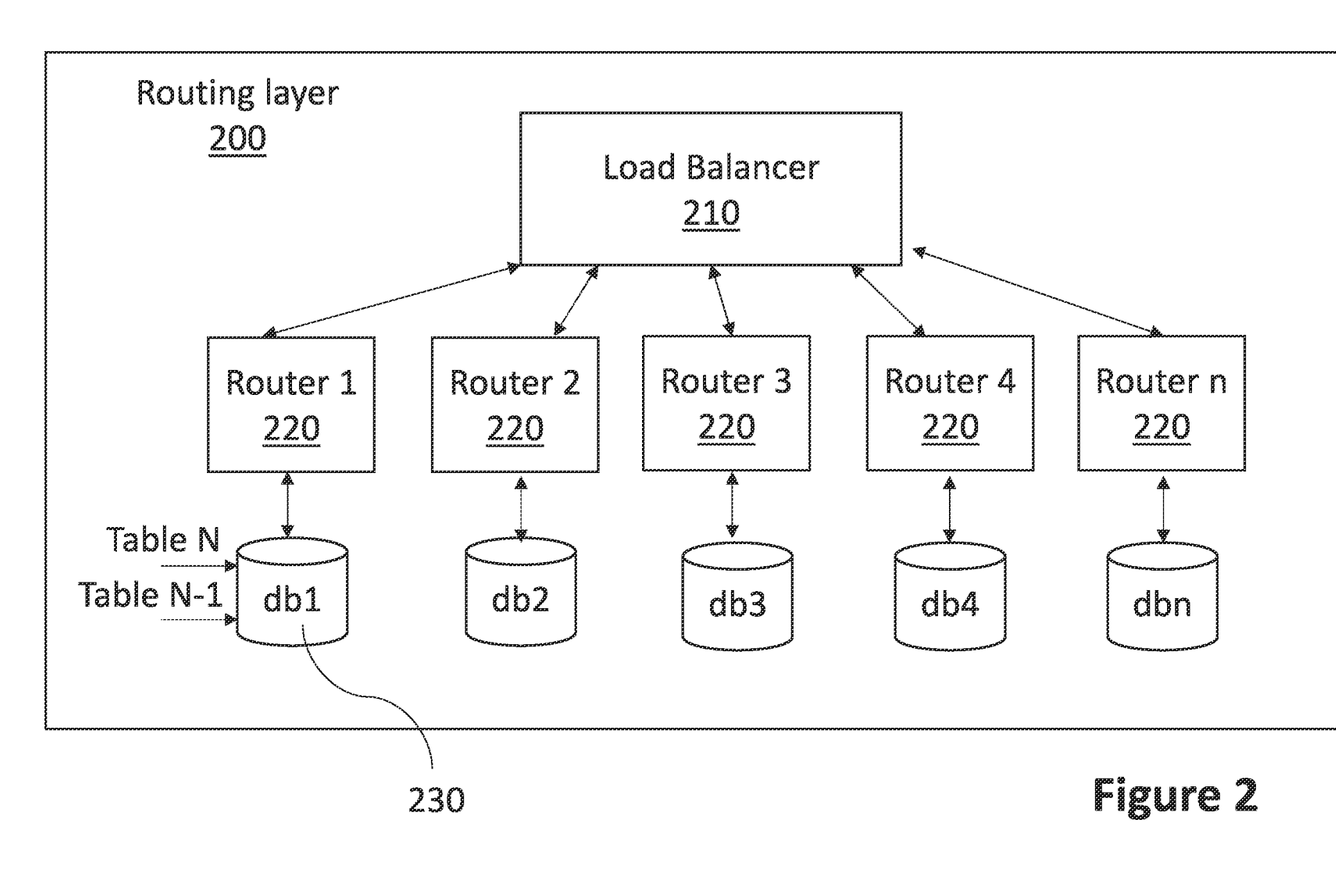
FIG. 2 shows an example of a routing layer architecture according to embodiments of the present invention.

FIG. 2 shows an example of the architecture of the routing layer 200 according to embodiments of the present invention. The routing layer 200 may be provided with a load balancer 210, which is configured to receive messages from one or more source systems 100 and distribute them to routers 220. The load balancer 210 may be configured to monitor the processing load of each router and accordingly determine the availability of a router to process inbound messages. In general, the load balancer 210 is configured to balance the inbound and outbound traffic between the source system 300 and the routers 220 of the routing layer 200. Each router 220 is configured to process the inbound messages received from the load balancer 210 and accordingly generate outbound messages, which are routed to the message queue of the requested target system 400 in accordance with a routing table version stored in a local database 230. The outbound message comprises the information of the inbound message and information on the routing table version used to route the message. The local database 230 may be configured to store two routing table versions, namely: a) the latest routing table version deployed in the system, table N; and b) the last routing table version used by a router 220 to route messages, table N−1. Each time a new routing table version is deployed in the messaging system, the local database 230 is updated with the new information. However, routers 220 may not switch automatically to the new routing table version and instead continue to route messages with the last routing table version used by the router. The local database 230 may be a shared database, or each router 220 may be communicatively coupled to a corresponding local database 230. The local database 230 may also be in the form of a cache, which may be part of router 220.

Figure 3:
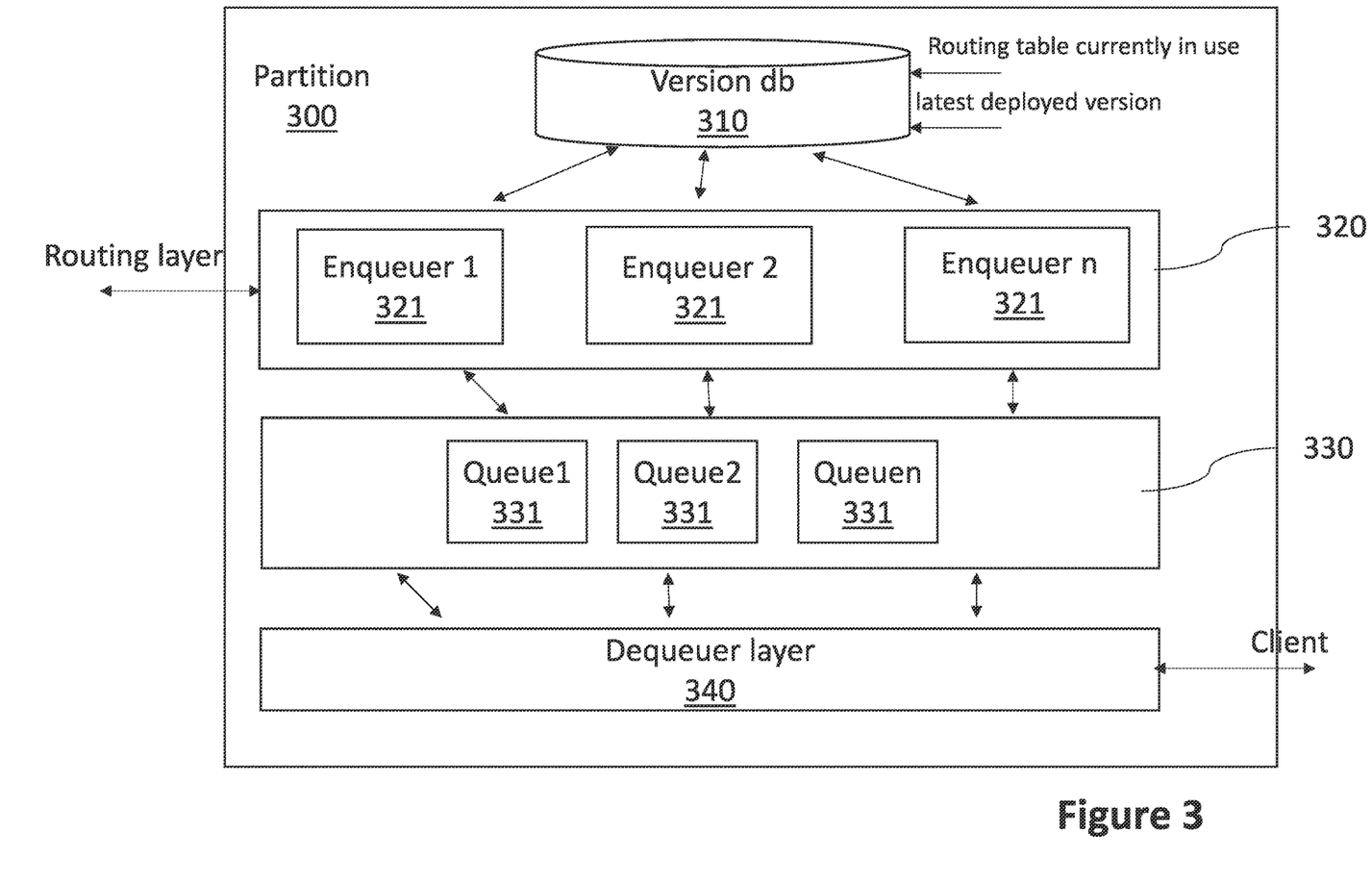
FIG. 3 shows an example of a computer ode architecture according to an embodiment of the present invention.

FIG. 3 shows an example of a message processing partition 300 architecture according to embodiments of the present invention. Partition 300 comprises an enqueuer layer 320 configured for receiving inbound messages from the routing layer 200, which are then forward to a message queue layer 330 for delivery to the target system 400 by means of a dequeuer layer 340. The enqueuer layer 320 comprises one or more enqueuers 321, each configured to manage one or more message queues 331 of the message queue layer 330. Each enqueuer 321 is configured, in response to receiving an outbound message from the routing layer 200, to determine whether the message was routed with the correct routing table version. Each enqueuer is configured to retrieve from a version database 310 a system state comprising information associated with the latest routing table version deployed in the messaging system and information associated with the latest routing table version used to route outbound messages to the requested message queue. The enqueuer 321 compares the routing table version information contained in the system with the routing table version information sent together with the outbound message. The enqueuer 321 compares the routing table version information received from the version database with the routing information contained in the outbound message. If the routing table version information of the outbound message indicate that the routing table version used by the router is older than the currently deployed version and/or the currently in use routing table version, then the enqueuer 321 is configured to reject the outbound message, otherwise, the message is added to the message queue so that it can be forwarded to the target system 400.

In this way, outbound messages routed with the wrong routing table version are identified and rejected. The enqueuer 321, upon processing the outbound message, issues a notification to the router 220 that transmitted the outbound message. The notification contains a set of values, which may in the form of a tuple, that indicate the currently deployed routing table version and the routing table version currently in use. If the values are not equal, then the system is in the activation state, whereby the routers 220 are in a double-routing mode, and each inbound message received is processed twice. The activation state indicates that some of the components have started to use the new routing table version deployed during a deployment phase, but other components still use the previous routing table version. As such, the router is informed that it needs to switch to the new routing table version stored in the local database 230. In the activation state, each router 220 is configured to process the inbound message first with the latest configuration deployed in the system and then with the latest routing table version used by the router 220 to route messages. The router performs this double routing procedure to determine whether the enqueuers 321 scheduled to receive the inbound message are the same in both the latest deployed and latest used routing table versions. If the enqueuers 321 are different, then the router 220, prior to sending the outbound message with the new routing table version, would send one or more notifications to one or more of the enqueuers 321 defined in the latest routing table version used by the router 220. The notifications indicate the routing table version currently in use, and as such, the enqueuers 321 should reject messages routed with older routing table versions. The notifications are sent in the form of normal outbound messages but with no payload. The enqueuers 321 receiving the notifications issued by the routers 220 and update their local cache or version database 310. As a result of the double-routing process, the enqueuers 321, which used to receive similar outbound messages routed against the older routing table version, are notified of the routing table version change and thus won't enqueue outbound messages from routers 220 that use an older version. In this way, switching to the new routing table version is accomplished with a single switch at each router 220.

In general, the tuple values sent by the enqueuer define whether the system is in a normal processing state, deployment state, or activation state. A change in the routing table version indicates a transition from the normal processing state, where messages are routed with an old routing table version, to the deployment state, where a new routing table version is deployed, then to the activation state, where the components switch to the new routing table version, and finally back to normal processing state, where all components are using the new routing table version.

Figure 4:
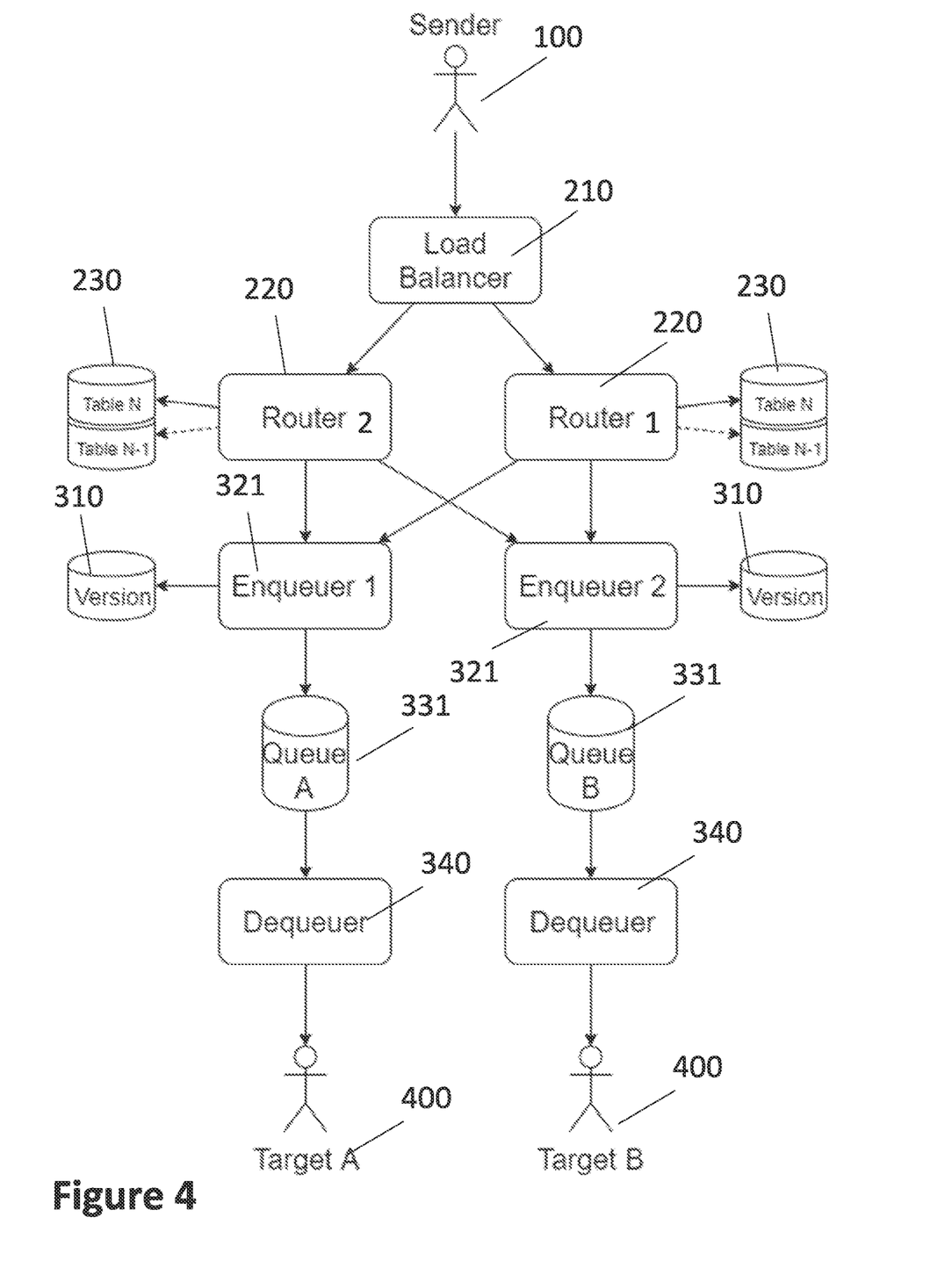
FIG. 4 shows an exemplified implementation of the distributed messaging system of FIG. 1 according to embodiments of the present invention.

FIG. 4 shows an example of a distributed messaging system according to embodiments of the present invention. As previously discussed, a load balancer 210 is configured to distribute inbound messages received from a sender 100 to the routers 22o of a distributed routing layer 200. Each of the routers 220 may be communicatively coupled to a local database 230, which is configured to store the latest routing table version used by the router, table N−1, and the currently deployed routing table version, Table N. The routers route messages in accordance with a routing table version selected by the router 220. Depending on the system state of the distributed message system, the routers 220 may haven't switched yet to the new routing table version, and as such, the system may be in the activation state. A router 220 that hasn't switched yet to the new routing table version would perform the routing using the old routing table version. The enqueuer 321 receiving the outbound message would compare the routing table version of the outbound message with the routing table version information representing the system stored in the version database 310. If the routing table version of the outbound message is older than the routing table version indicated in the system state, then the enqueuer would reject the message and send a notification to router 220, as previously discussed with reference to FIG. 3. It should be noted, the enqueuer 321 is configured to propagate outbound messages routed with a routing table version that is equal or newer than the routing table versions indicated in the system state. The router receiving the rejection notification would switch to the new routing table version stored in the local database and reprocess the inbound message first with the old routing table version, table N−1, and then with the new routing table version, table N.

As such, a set of notification would be issued to the enqueuers 321 scheduled to receive outbound messages with the old routing table version before the outbound message is sent to the enqueuer with the new routing table version. In this way, the enqueuers 321 indicated in the old routing table version would be notified of the routing table version update and only enqueue messages that are routed with the new routing table version. Accordingly, the enqueuers 321 would update the system state information in the version database 310. The enqueued messages are placed in a message queue 331 associated with the target system 440. One or more dequeuers may be used to deliver the message from the message queue 331 to the target system 400. Based on the tuple values contained in the notification issued by an enqueuer 321, the routers 220 are configured to determine whether the outbound message was enqueued successfully or rejected. If the outbound message was successfully processed by an enqueuer 321 then router 220 issues a notification to the source system 100 via the load balancer 210. The source system 100 may be configured to send the inbound messages in the sequence only when the previous messages has been processed successfully.

Figure 5:
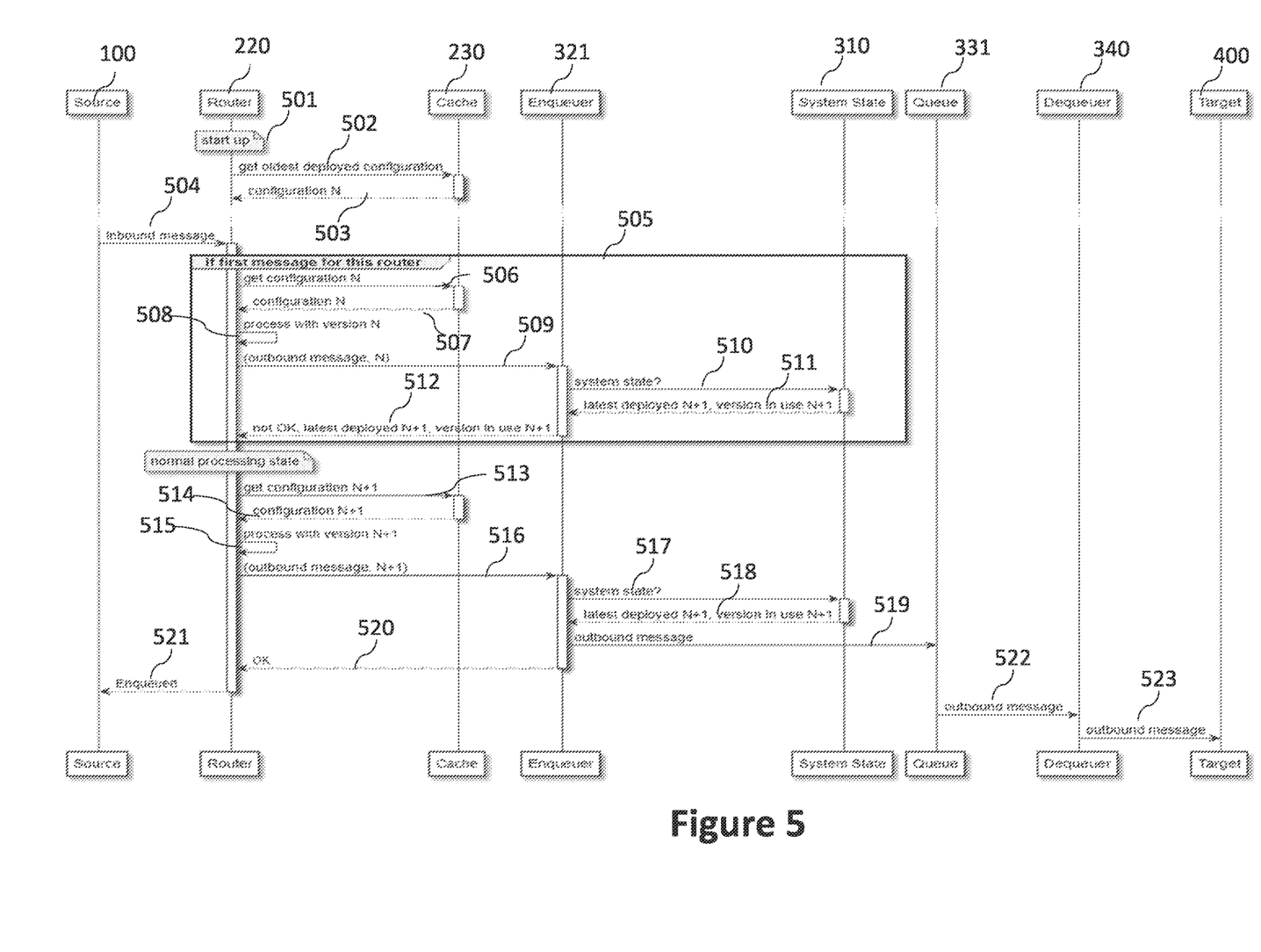
FIG. 5 shows an exemplified workflow diagram of the operation of the distributed messaging system operating in normal processing mode according to embodiments of the present invention.

FIG. 5 shows an exemplified workflow of the operation of the distributed messaging system according to embodiments of the present invention. As shown, at start-up, in step 501, router 220 is activated and queries, at step 502, the local cache 230 for the oldest deployed routing table version, table N. The cache 230 responds, at step 503, with the request routing table version, which becomes the version that would be used by the router 220 to route messages. At step 504, an inbound message is transmitted by the source system 100 to router 220. If this is the first outbound message received at the router 220, would retrieve the oldest deployed routing table version, table N, from the local cache 230 at steps 506 and 507. At step 508, the inbound message is processed using the retrieved routing table version, table N. At step 509, the outbound is transmitted to the enqueuer 321. The enqueuer 321, upon receiving the outbound message, queries and retrieves from the version database 310 the system state, at steps 510 and 511, which contains the currently deployed routing table version and the routing table version currently in use, which in this case are the same, e.g. Table N+1. Since the routing table version used to route the outbound message is older than the currently deployed version and/or the routing table version currently in use, the enqueuer 321 rejects the outbound message and sends a notification to the router, at step 512, indicating that the outbound message. The notification further comprises the version of the deployed routing table and the version of the routing table currently in use, which are the same, i.e. Table N+1.

The router 220, upon receiving the notification and since the tuple values are the same, thereby indicating that the system is the normal state, retrieves at step 513 and 514, the new routing table version, table N+1, from the cache 230, and reprocesses, at step 515, the inbound message with the new routing table configuration. The router 220 sends the outbound message again to the enqueuer 321 at step 516. The enqueuer 321 again queries and retrieves from the version database 310 the system state, at steps 517 and 518. In this case, since the routing table version used to route the outbound message is the same as the currently deployed version and the currently in use routing table version, i.e. both versions are table N+1, then the enqueuer 321 enqueues, at step 519, the outbound message to the message queue and sends, at step 520 a notification to the router 220 indicates the successful processing. The router 220 then sends a notification, at step 521, to the source system 100. The outbound message is sent, at step 522, to the dequeuer 340, which in turn forwards the message to the target system 400, at step 523.

Figure 6:
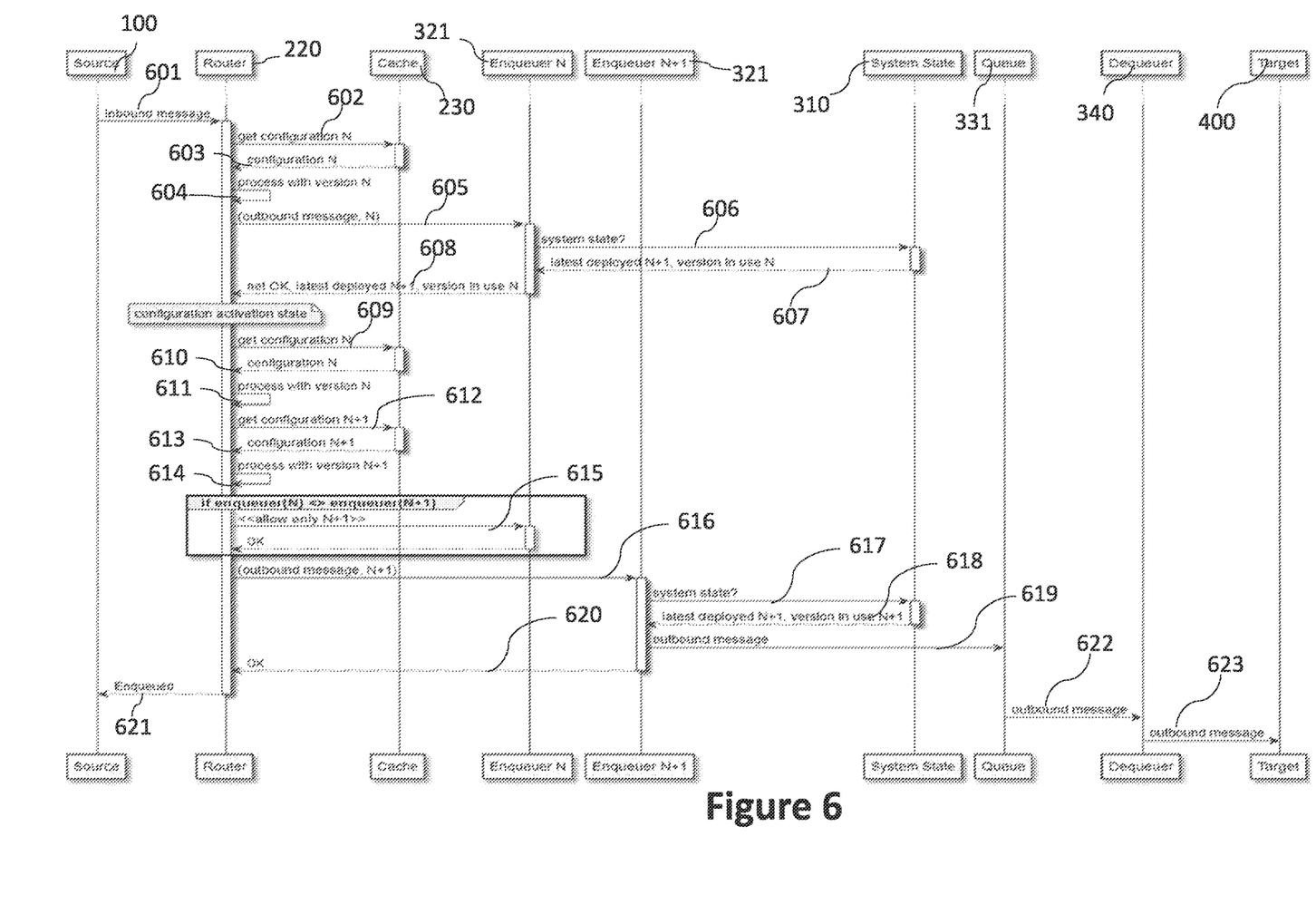
FIG. 6 shows an exemplified workflow diagram of the operation of the distributed messaging system operating in activation mode according to embodiments of the present invention.

FIG. 6 shows an exemplified workflow of the operation of the distributed messaging system in the activation mode according to embodiments of the present invention. At step 601, the source system 100 sends an inbound message to router 220. The router 220 queries and retrieves, at steps 602 and 603, the last deployed routing table version, Table N, which is used at step 604 to process the inbound message. The router 220 sends at step 605 the outbound message using routing table N to the enqueuer 321. The enqueuer 321 queries and retrieves, at steps 606 and 607, from the version database 310 the system state containing the routing table version information for the currently deployed routing table version, which in this case is version Table N+1, and the routing table version currently in use, which is Table N. The enqueuer 321 compares the routing table version of the outbound message, table N, and the routing table versions in the system state, Table N+1 and Table N, and since the routing table version of the outbound message is older than the currently deployed routing table version, Table N+1, the enqueuer rejects the outbound message. A notification is sent, at step 608, to the router 220 indicating the rejection and the values for the currently deployed routing table version, Table N+1, and the routing table version in use, Table N.

Since the tuple values indicate that the versions for the deployed and currently in use routing table are different, then router switches to the activation mode, where each inbound message is processed twice. At step 609, the router retrieves first the latest used routing table version, table N, and reprocesses the corresponding inbound message, then it retrieves, at step 610, the new routing table version, table N+1, and again reprocesses the inbound message with the new routing table version. The router 220 checks whether the enqueuer 321 scheduled to receive the next outbound message in the new routing table version, table N+1, is different from the enqueuer 321 scheduled to receive the next outbound message with the last used routing table version, Table N. If the enqueuers 321 are different, then at step 615, a set of notifications are sent to one or more enqueuers 321 defined in latest routing table version used by the router 220, Table N. The enqueuer 321 responds with a notification that has received the message from the router 220, and updates the corresponding system state in the version database 310. At step 616, the router sends the outbound message to the new enqueuer 321, enqueuer N+1, identified in the new routing table version, table N+1. The enqueuer N+1 processes the outbound messages, and as previously queries and retrieves at steps 617 and 618, the system state containing information on the latest deployed routing table version and routing table version currently in use by the version database 310. Since the currently deployed version, Table N+1, is the same as the routing table used by the router, table N+1, the processing is successful, and the enqueuer adds, at step 619, the message to the corresponding message queue 331. Once the outbound message is successfully enqueued, the enqueuer N+1 sends a successful processing notification to the router, at step 620. The router 220 issues a corresponding notification to the source system at step 621, indicating that the inbound message was successfully enqueued. The outbound message is forwarded at step 622 to the dequeuer 340 and at step 623 to the target system 400. It should be noted that steps defined in the workflow of FIGS. 5 and 6 can be performed in any desirable order, e.g. some of the steps may be performed earlier, later, or simultaneously with other steps.

In general, if the messaging system is configured to be operated in the three modes described with reference to FIGS. 2 to 4, namely: normal processing, deployment, and activation. In the case the system 100 is operated in another mode of operation, it may be due to a failure. In that case, a notification may be issued to an administrator and/or a fall-back system so that the communication of messages between the sender and the target system can continue.

In some embodiments, the method comprises method steps corresponding to any one of the systems for managing the allocation of computing resources functions set out above.

The invention claimed is:

1. A method for communicating messages in a distributed messaging system between a source system and one or more target systems, the method comprising:
  receiving, at a router of a routing layer, an inbound message from the source system for delivery to a requested target system;
  generating, by the router, an outbound message corresponding to the received inbound message;
  routing, by the router, the outbound message to an enqueuer associated with the requested target system in accordance with a routing table, the outbound message comprising a routing table version used by the router during processing of the inbound message;
  receiving, at the enqueuer, the outbound message; and
  in response to receiving the outbound message from the router, at the enqueuer:
    retrieving from a version database a system state comprising information associated with the latest routing table version deployed in the messaging system and information associated with the latest routing table version used to route outbound messages to the requested target system,
    comparing the routing table version of the outbound message with the routing table version information contained in the retrieved system state; and
    in response to determining that the routing table version of the outbound message is older than at least one of (i) the latest deployed routing table version, or (ii) the latest routing table version used to route messages to the requested target system, rejecting the outbound message, and otherwise, enqueuing the outbound message to a message queue associated with the requested target system.

2. The method of claim 1, further comprising, at the enqueuer:
  upon processing the outbound message, sending a processing notification to the corresponding router indicating the successful enqueuing or rejection of the outbound message.

3. The method of claim 2, further comprising, at the router:
  in response to receiving a rejection notification, switching to the latest deployed routing table version stored in the local database; and
  reprocessing the corresponding inbound message with the new routing table version.

4. The method of claim 2, wherein the processing notification comprises a set of values representing the system state of the distributed messaging system.

5. The method of claim 4, further comprising, at the router:
  comparing the set of values contained in the processing notification to determine if the latest routing table version deployed in the messaging system and the latest routing table version used to route outbound messages are equal, and
  in response to the routing table versions being different, switching to an activation mode, where each inbound message is processed first with the latest routing table version used by the router and subsequently with the latest deployed routing table version stored in the local database.

6. The method of claim 5, further comprising, at the router:
  prior to sending the outbound message, determining if the enqueuer scheduled to receive the next outbound message is the same in both the latest deployed routing table version and the latest routing table version used by the router.

7. A distributed messaging system configured for communicating messages between a source system and one or more target systems, the messaging system comprising:
  a routing layer comprising a plurality of routers, each router configured to:
    receive inbound messages from the source system, each inbound message associated with a requested target system;
    generate corresponding outbound messages; and
    route the outbound messages to enqueuers associated with the target systems in accordance with a routing table stored in a local database associated with one or more routers of the routing layer, each outbound message comprising a routing table version used by the router during processing of the inbound message;
  a plurality of the enqueuers, each enqueuer configured, in response to receiving an outbound message from the routing layer, to:
    retrieve from a version database a system state comprising information associated with the latest routing table version deployed in the messaging system and information associated with the latest routing table version used to route outbound messages to the target systems;

compare the routing table version of the outbound message with the routing table version information contained in the retrieved system state; and in response to determining that the routing table version of the outbound message is older than at least one of (i) the latest deployed routing table version, or (ii) the latest routing table version used to route messages to the target systems, reject the outbound message, and otherwise, enqueue the outbound message to a message queue associated with the requested target system.

8. The distributed messaging system of claim 7, wherein each enqueuer is configured, upon processing of the outbound message, to send a processing notification to the corresponding router indicating the successful processing or rejection of the outbound message.

9. The distributed messaging system of claim 8, wherein each router is configured, in response to receiving a rejection notification, to switch to the latest deployed routing table version stored in the local database and reprocess the corresponding inbound message with the new routing table version.

10. The distributed messaging system of claim 8, wherein the processing notification comprises a set of values representing the system state of the distributed messaging system.

11. The distributed messaging system of claim 10, wherein the set of values is in the form of a tuple.

12. The distributed messaging system of claim 10, wherein each router is configured to compare the set of values contained in the processing notification to determine if the latest routing table version deployed in the messaging system and the latest routing table version used to route outbound messages are equal, and in response to the routing table versions being different, each router is configured to switch to an activation mode, where each inbound message is processed first with the latest routing table version used by the router and subsequently with the latest deployed routing table version stored in the local database.

13. The distributed system of claim 12, wherein each router is configured, prior to sending the outbound message, to determine if the enqueuer scheduled to receive the next outbound message is the same in both the latest deployed routing table version and the latest routing table version used by the router.

14. The distributed system of claim 13, wherein in response to the enqueuer scheduled to receive the next outbound message being different, each router is configured to first send a set of routing notifications to one or more enqueuers defined in the latest routing table version used by the router, the routing notifications indicating to the one or more enqueuers the version of the routing table currently in use by the messaging system for routing messages.

15. The distributed system of claim 14, wherein in response to receiving a routing notification, each enqueuer is configured to update the system state in the version database with the information of the routing table version currently in use by the messaging system.

16. The distributed messaging system of claim 8, wherein in response to a successful processing of an outbound message, each router is configured to send a corresponding enqueued notification to the source system.

17. The distributed messaging system of claim 16, wherein the source system is configured, upon receiving the enqueued notification from the router, to transmit the next inbound message in the queue to the routing layer.

18. The distributed messaging system of claim 7, wherein each router is configured for storing inbound and outbound messages until they are successfully processed by the enqueuers associated with the corresponding message queues.

19. The distributed messaging system of claim 7, wherein each message queue is communicatively coupled to a dequeuer layer, which is configured to deliver messages from the message queue to the corresponding target system.

20. The distributed messaging system of claim 7, wherein the routing table comprises a map between the message queues and the corresponding enqueuers.

* * * * *